US012670252B2

(12) United States Patent　　　　　(10) Patent No.:　US 12,670,252 B2
Merchan et al.　　　　　　　　　　　　(45) Date of Patent:　Jun. 30, 2026

(54) METHODS AND SYSTEMS FOR PROTECTING COMPUTER SYSTEMS FROM ENCRYPTION-BASED MALWARE

(71) Applicant: Robert Bosch GmbH, Stuttgart (DE)

(72) Inventors: Jorge Guajardo Merchan, Pittsburgh, PA (US); Shalabh Jain, Pittsburgh, PA (US); Pradeeep Pappachan, Pittsburgh, PA (US); Stefan Gehrer, Pittsburgh, PA (US); Christoph Peylo, Damme (DE); Philipp Schott, Weinstadt (DE); Christopher Martin, Sunnyvale, CA (US)

(73) Assignee: Robert Bosch GmbH, Stuttgart (DE)

( * ) Notice: Subject to any disclaimer, the term of this patent is extended or adjusted under 35 U.S.C. 154(b) by 156 days.

(21) Appl. No.: 18/194,045

(22) Filed: Mar. 31, 2023

(65) Prior Publication Data

US 2024/0330459 A1　　　Oct. 3, 2024

(51) Int. Cl.
*G06F 21/56*　　　　(2013.01)
*G06F 21/55*　　　　(2013.01)
(52) U.S. Cl.
CPC .......... *G06F 21/566* (2013.01); *G06F 21/556* (2013.01); *G06F 21/568* (2013.01)
(58) Field of Classification Search
CPC ......... G06F 21/55–568; G06F 11/3062; G06F 11/3466; G06F 11/348; G06F 11/3495; G06F 11/3024; G06F 2221/034
See application file for complete search history.

(56) References Cited

U.S. PATENT DOCUMENTS

| | | | | |
|---|---|---|---|---|
| 10,609,066 | B1 * | 3/2020 | Nossik | H04L 63/1408 |
| 2008/0276111 | A1 * | 11/2008 | Jacoby | G06F 11/3062 |
| | | | | 713/340 |
| 2018/0007074 | A1 * | 1/2018 | Kune | G06F 1/28 |
| 2018/0101678 | A1 * | 4/2018 | Rosa | G06F 3/0622 |
| 2018/0114020 | A1 * | 4/2018 | Hirschberg | G06F 21/566 |
| 2019/0332766 | A1 * | 10/2019 | Guri | G06F 21/565 |
| 2021/0026961 | A1 * | 1/2021 | Underwood | G06F 21/566 |
| 2021/0194921 | A1 | 6/2021 | Guajardo Merchan et al. | |
| 2022/0100853 | A1 | 3/2022 | Gehrer et al. | |
| 2024/0086532 | A1 * | 3/2024 | Das | G06F 21/56 |

FOREIGN PATENT DOCUMENTS

| | | | | |
|---|---|---|---|---|
| RU | 2749502 C1 * | 6/2021 | ............. | G06F 12/14 |

OTHER PUBLICATIONS

Melton J., Detecting Ransomware Through Power Analysis, 2018. (Year: 2018).*
Azmoodeh et al., Detecting crypto-ransomware in IoT networks based on energy consumption footprint, 2017. (Year: 2017).*

(Continued)

*Primary Examiner* — Trong H Nguyen
(74) *Attorney, Agent, or Firm* — Brooks Kushman P.C.

(57) ABSTRACT

The present disclosure includes descriptions of methods and systems for executing a countermeasure against executed ransomware and for extracting an encryption key used by the ransomware. Embodiments disclosed herein comprise analyzing power consumption data of one or more processors executing the ransomware.

22 Claims, 5 Drawing Sheets

(56) References Cited

OTHER PUBLICATIONS

Bridges et al., Towards Malware Detection via CPU Power Consumption: Data Collection Design and Analytics, 2018. (Year: 2018).*

Gonzalez et al., Detecting Malicious Software Execution in Programmable Logic Controllers Using Power Fingerprinting, 2016. (Year: 2016).*

Yang et al., Power Consumption Based Android Malware Detection, 2016. (Year: 2016).*

Cicala, Fabrizio, and Elisa Bertino. "Analysis of encryption key generation in modern crypto ransomware." IEEE Transactions on Dependable and Secure Computing 19.2 (2020): 1239-1253.

Oz, Harun, et al. "A survey on ransomware: Evolution, taxonomy, and defense solutions." ACM Computing Surveys (CSUR) 54.11s (2022): 1-37.

Kharraz, Amin, et al. "Unveil: a large-scale, automated approach to detecting ransomware." USENIX Security symposium. vol. 25. 2016.

Xu, Dongpeng, Jiang Ming, and Dinghao Wu. "Cryptographic function detection in obfuscated binaries via bit-precise symbolic loop mapping." 2017 IEEE Symposium on Security and Privacy (SP). IEEE, 2017.

Kharraz, Amin, William Robertson, and Engin Kirda. "Protecting against ransomware: A new line of research or restating classic ideas?." IEEE Security & Privacy 16.3 (2018): 103-107.

HCPTKBN, Scaife. "Stopping ransomware attacks on user data." W Cryptolock (2016).

Kolodenker, Eugene, et al. "Paybreak: Defense against cryptographic ransomware." Proceedings of the 2017 ACM on Asia Conference on Computer and Communications Security. 2017.

Continella, Andrea, et al. "Shieldfs: a self-healing, ransomware-aware filesystem." Proceedings of the 32nd annual conference on computer security applications. 2016.

Shamir, Adi, and Nicko Van Someren. "Playing 'hide and seek' with stored keys." Financial Cryptography: Third International Conference, FC'99 Anguilla, British West Indies, Feb. 22-25, 1999 Proceedings 3. Springer Berlin Heidelberg, 1999.

Kharraz, Amin, and Engin Kirda. "Redemption: Real-time protection against ransomware at end-hosts." Research in Attacks, Intrusions, and Defenses: 20th International Symposium, RAID 2017, Atlanta, GA, USA, Sep. 18-20, 2017, Proceedings. Springer International Publishing, 2017.

Huang, Jian, et al. "FlashGuard: Leveraging intrinsic flash properties to defend against encryption ransomware." Proceedings of the 2017 ACM SIGSAC Conference on Computer and Communications Security. 2017.

Taylor, Michael A., Kaitlin N. Smith, and Mitchell A. Thornton. "Sensor-based ransomware detection." Future Technologies Conference. 2017.

Kim, Haeun, et al. "Dynamic ransomware protection using deterministic random bit generator." 2017 IEEE Conference on Application, Information and Network Security (AINS). IEEE, 2017.

Kocher, Paul C. "Timing attacks on implementations of Diffie-Hellman, RSA, DSS, and other systems." Advances in Cryptology—CRYPTO'96: 16th Annual International Cryptology Conference Santa Barbara, California, USA Aug. 18-22, 1996 Proceedings 16. Springer Berlin Heidelberg, 1996.

Kocher, Paul, Joshua Jaffe, and Benjamin Jun. "Differential power analysis." Advances in Cryptology—CRYPTO'99: 19th Annual International Cryptology Conference Santa Barbara, California, USA, Aug. 15-19, 1999 Proceedings 19. Springer Berlin Heidelberg, 1999.

Suresh Chari, Josyula R. Rao, Pankaj Rohatgi: Template Attacks. CHES 2002: 13-28.

Brier, Eric, Christophe Clavier, and Francis Olivier. "Correlation power analysis with a leakage model." Cryptographic Hardware and Embedded Systems—CHES 2004: 6th International Workshop Cambridge, MA, USA, Aug. 11-13, 2004. Proceedings 6. Springer Berlin Heidelberg, 2004.

Järvinen, Kimmo, and Josep Balasch. "Single-trace side-channel attacks on scalar multiplications with precomputations." Smart Card Research and Advanced Applications: 15th International Conference, CARDIS 2016, Cannes, France, Nov. 7-9, 2016, Revised Selected Papers 15. Springer International Publishing, 2017.

Kerins, Tim, and Klaus Kursawe. "A cautionary note on weak implementations of block ciphers." 1st Benelux Workshop on Information and System Security (WISSec 2006). vol. 12. 2006.

* cited by examiner

GENERATING POWER
CONSUMPTION DATA FOR A
MONITORED PROCESSOR

102

ANALYZING THE GENERATED
POWER CONSUMPTION DATA

104

IN RESPONSE TO THE ANALYSIS:

DETECTING MALWARE EXECUTED BY
THE MONITORED PROCESSOR AND
DETECTING THE USE OF AN
ENCRYPTION KEY BY THE MALWARE

106

METHODS AND SYSTEMS FOR PROTECTING COMPUTER SYSTEMS FROM ENCRYPTION-BASED MALWARE

TECHNICAL FIELD

The present disclosure relates to security of a computer system. The present disclosure includes descriptions of methods and systems for protecting a computer system against encryption-based malware.

BACKGROUND

Encryption-based malware ("EBM") may refer to software that executes on a host system and encrypts files present in the host's filesystem. Ransomware is a type of EBM that can threaten to publish a victim's confidential data or permanently block access to the victim's data, making the data inaccessible and unusable. Ransomware may be generally classified into two types, namely cryptographic ransomware that encrypts the victim files, and locker ransomware that prevents victims from accessing their systems by encrypting files containing the victim's data and/or encrypting some of the files needed for the victim's system to boot. The deployers of ransomware typically demand a ransom payment to restore or decrypt the encrypted files. Examples of some recent ransomware attacks are WannaCry, Petya, NotPetya, DarkSide, etc.

Ransomware attacks have become some of the most financially crippling cybersecurity threats to its victims, including organizations, such as corporations. With an increase in the financial reward for attackers, the complexity and evasiveness of ransomware variants has been constantly evolving to evade most modern defense methods.

SUMMARY

In one or more embodiments, this disclosure describes novel power-based analysis methods and systems for detecting EBM attacks and protecting the potential victim's infrastructure by identifying and/or extracting an encryption key from the EBM. In some embodiments, the present disclosure describes a malware detection system comprising: one or more processors; and memory, communicatively connected to the one or more processors, including processor-executable instructions that when executed by the one or more processors cause the malware detection system to perform the following operations: generating power consumption data for a monitored processor; analyzing the generated power consumption data; and in response to the analysis: detecting malware executed by the monitored processor; and detecting a use of an encryption key by the malware.

In some embodiments, the present disclosure describes a malware detection system, comprising: a host device including: one or more host processors; and memory, communicatively connected to the one or more host processors, including processor-executable instructions that when executed by the one or more host processors cause the system to perform prevention operations of: generating power consumption data for a monitored processor; analyzing the generated power consumption data; and in response to the analysis: detecting malware executed by the monitored processor; and detecting a use of an encryption key by the malware; and an external device including: a communication module configured to plug into the host system; memory including predetermined files, the predetermined files being accessible by the host device when the external device is plugged into the host device via the communication module; and a processor communicatively connected to the communication module and the memory, the processor configured to perform operations of: monitoring a state of the predetermined files; detecting a change in the state of the predetermined files; and in response to detecting the change in the state of the predetermined files, performing operations of: triggering the performance of the host prevention operations.

In some embodiments, the present disclosure describes a malware detection network, comprising: at least one malware detection system, comprising: at least one port predetermined to be accessible to malware attacks; one or more processors; and memory, communicatively connected to the one or more processors, including processor-executable instructions that when executed by the one or more processors cause the system to perform the following operations: generating power consumption data for a monitored processor; analyzing the generated power consumption data; and in response to the analysis: detecting malware executed by the monitored processor; and detecting a use of an encryption key by the malware.

DETAILED DESCRIPTION

Embodiments of the present disclosure are described herein. It is to be understood, however, that the disclosed embodiments are merely examples and other embodiments may take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present embodiments. As those of ordinary skill in the art will understand, various features illustrated and described with reference to any one of the figures may be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
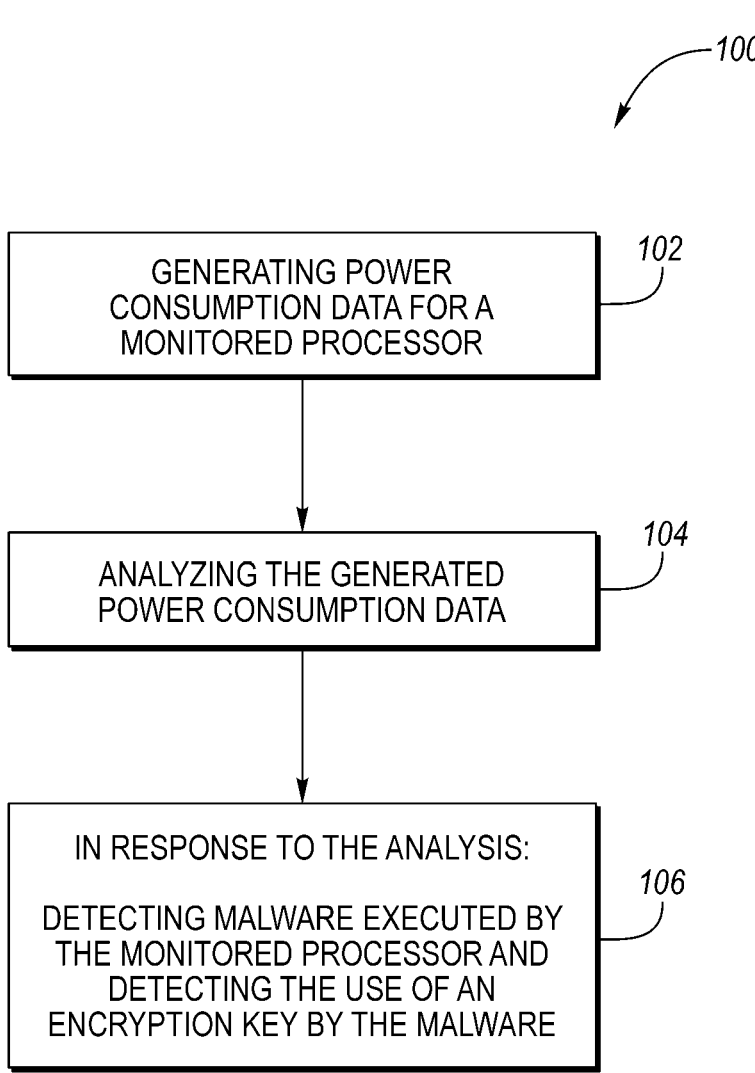
FIG. 1 illustrates a flowchart of an exemplary method performed by some disclosed embodiments.

FIG. 1 illustrates a flowchart of an exemplary method 100 performed by some disclosed embodiments. In some embodiments, the steps 102, 104, and 106 may be performed sequentially. In some embodiments, two or more of the steps 102, 104, 106 may be performed simultaneously. For example, the analyzing of the generated power consumption data 104 may be performed as the consumption data is being generated 102. Additionally, the operations of detecting malware and detecting a use of an encryption key may be performed simultaneously in some disclosed embodiments. In some embodiments, the steps 102, 104, and 106 may be reordered.

In step 102, power consumption data is generated for a monitored processor. A monitored processor may be any processor of a system that may be subject to a malware attack. For example, the monitored processor may be a processor (e.g., a CPU) included in a personal computer, a desktop computer, a mobile computer, a laptop computer, a notebook computer, a terminal, a workstation, a server computer, a Personal Digital Assistant (PDA) device, a tablet computer, an electronic control unit ("ECU"), a network device, or any other suitable computing device. Such systems may also include a plurality of input units, a plurality of output units, a plurality of memory units, a plurality of storage units, and/or other suitable hardware components and/or software components. For example, a system as described herein may include one or more devices such as computing device 500 shown in FIG. 5.

In some embodiments, a system may include or may be, for example, a plurality of components that include a respective plurality of CPUs, e.g., a plurality of CPUs as described, a plurality of CPUs embedded in an on board, or in-vehicle, system or network, a plurality of chips, FPGAs or SOCs, microprocessors, transceivers, microcontrollers, a plurality of computer or network devices, any other suitable computing device, and/or any combination thereof.

Figure 2:
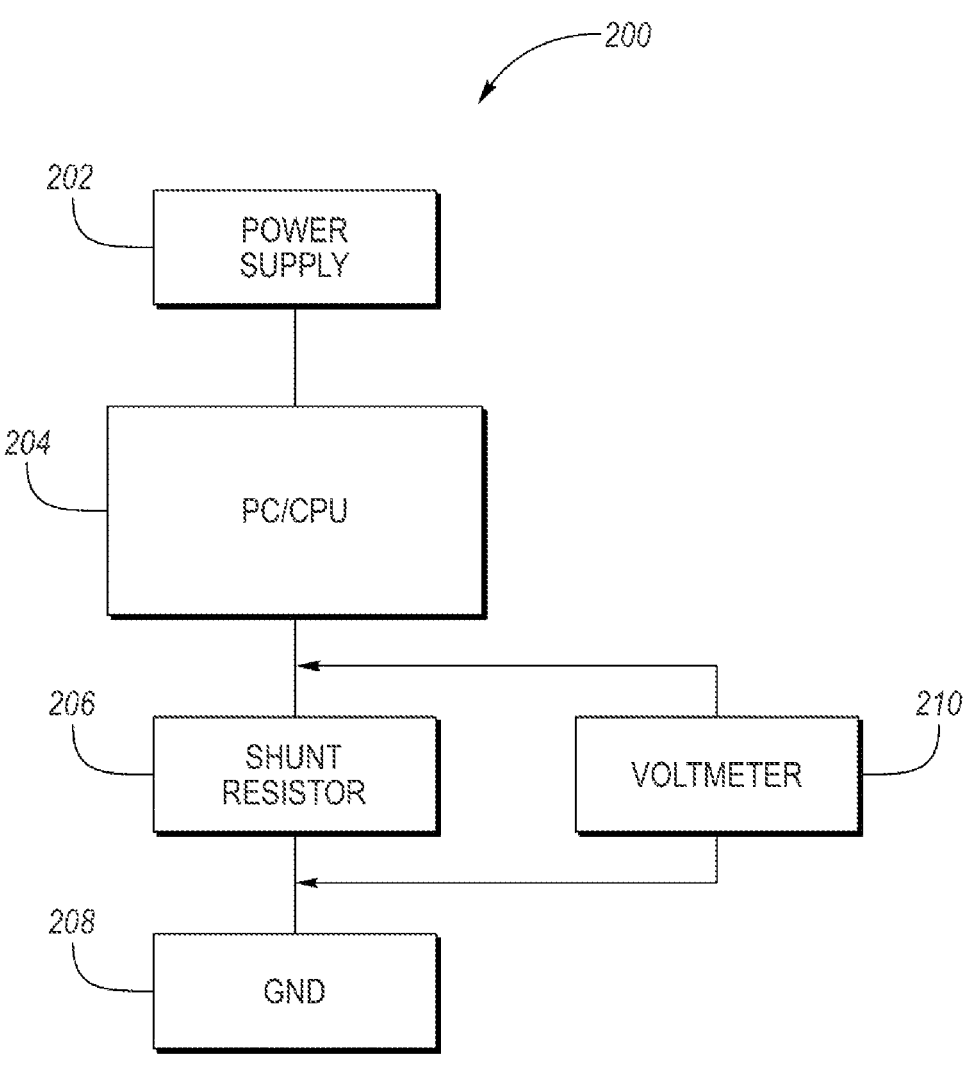
FIG. 2 illustrates an exemplary measurement device according to some disclosed embodiments.

In some embodiments generating power consumption data may include estimating power consumption data, measuring power consumption data, and/or deriving power consumption data. For example, the generated power consumption data may include measurement data obtained by a shunt resistor 206. FIG. 2 illustrates an example 200 of using a shunt resistor 206 to obtain measurement data (e.g., current drawn) useful as power consumption data. In FIG. 2, a CPU 204 uses power from a power supply 202. A shunt resistor 206 is connected to the CPU 202 and a ground 208. A voltmeter 210 is used to collect measurement data corresponding to the power usage by the CPU 204. For example, the voltmeter 210 may measure the voltage across the shunt resistor 206. The shunt resistor 206 may act as a voltage divider. Depending on the resistance (e.g., load) of the CPU 204, the ratio between shunt resistor 206 resistance (which is static) and the CPU 204 may change, which leads to a voltage drop across the shunt resistor 206. The voltmeter across the shunt resistor 206 can therefore be used to get an absolute and/or relative information about the load of the CPU 204. To perform the actual measurement and transform that measurement to a digital value that can be analyzed, a system may utilize an analog-to-digital converter (ADC) or an operational amplifier (e.g., op-amp). Such an embedded ADC may be available in a microcontroller. The collected measurement data may be advantageously included in generated power consumption data corresponding to the CPU 204.

Some embodiments may include measurements of other attributes of a CPU or system (e.g., other CPU or ECU usage, memory usage, opening files, usage of system encryption) in the generated power consumption data to determine whether anomalous software is being executed on a CPU. In some embodiments, measurements of physical attributes from one or more CPUs of a system may be derived from a sensor that can be utilized to identify physical attributes of the CPUs or the system. For example, a system may utilize a sensor such as a microphone, accelerometer, gyroscope, thermal component (thermistor), thermometers, or any other similar internal or external sensors, etc. A system may utilize an external or internal sensor to perform a device measurement of a physical property (e.g., power, timing, sound, temperature, vibration, etc.) to perform an initial baseline measurement. This measurement may be used to derive a fingerprint using, for example, machine learning (ML) techniques, signal processing techniques or a combination thereof. For example, a system may generate a fingerprint from utilizing a physical measurement of current or voltage from a CPU, as well as a temperature of the CPU. Generated power consumption data may be stored as raw data, such as the measurement data obtained by the shunt resistor 206.

In some embodiments, generating the power consumption data may include results of preprocessing (e.g., statistical analysis) of measurement data. Preprocessing of power consumption measurements may produce parameters that describe patterns in the data and these patterns and their parameters may be included in the generated power consumption data along with the measurement data. For example, the generated power consumption data may include a fingerprint or signature of power consumption by a monitored processor. Patterns in generated power consumption data (e.g., fingerprints or signatures) may be used as a profile of a monitored processor to detect malicious behavior, such as malware executing on the monitored processor. Generated power consumption data may be stored for later use.

In some embodiments, the step 104 of analyzing the generated power consumption data may be performed during the normal operation of a monitored processor to whether anomalous software (e.g., EBM) is being executed on the monitored processor. In some embodiments, the analysis compares generated power consumption data to previously generated power consumption data and may determine whether there exists one or more matches between the currently generated power consumption data and the previously generated power consumption data. In some embodiments, the analyzing step 104 determines that a predetermined threshold number of matches occurs between generated power consumption data and previously generated power consumption data.

In some embodiments, power consumption data may be used in combination with metadata of a monitored system. For example, malware typically generates a lot of disk I/O. Accordingly, measurement(s) of I/O activities may be combined with power consumption data to determine whether malware is executing on the monitored system. In some embodiments, malware can be correlated with more metadata such as: CPU usage, memory (RAM) usage, opened files, or usage of Advanced Encryption Standard New Instructions ("AES-NI") encryption engine. AES-NI includes special hardware instructions available in an X86 platform to perform certain Advanced Encryption Standard ("AES") operations faster than if the operations are performed in software. This metadata may also be measured using a physical (e.g., power) side-channel by, e.g., measuring the power drawn by the respective subsystems.

In some embodiments, a classifier may be trained to directly detect a power signature of malware executables. The power consumption of a PC may be correlated with the control flow of executables. This fact can be exploited by training the classifier on several malware power signatures. This technique might be limited to a known set of malware that the classifier was trained on and might fail when obfuscation techniques are used. The first limitation might be overcome by training the classifier on a large set of malware and trying to let it generalize as much as possible. For the latter the classifier could be trained to detect signatures of obfuscation techniques.

In some embodiments, previously stored power consumption data may include power consumption data generated during encryption of files that are known to have highly differentiable power signatures when encrypted. The files may be place in known locations in a system to be monitored by a malware detection system. In some embodiments, the files do not interfere with normal system operation and cannot be modified or used by a system user of the monitored system. The power signatures of these files may be stored in malware detection system and may be included in power profiles of the files. The malware detection system may monitor the system during normal operations of the system and may detect signatures of the encryption of known files and may execute a countermeasure.

In some embodiments, malware defeat circuitry may include an additional device, such as a USB or PCI module that can be plugged into a monitored machine through a USB port or PCI bus. The device may consist of memory containing well known files, that can be mapped to the monitored device as regular user files. The device may additionally contain a co-processor that monitors the state of the additional files. For detection, the co-processor in the external device monitors the state of the files that are mapped to the disk. A change in the state of the co-processor may trigger prevention mechanisms. As USB/PCI devices are typically slave devices, a privileged executable and/or a driver on the host system can be made aware of this USB/PCI device and execute the prevention mechanism.

Additionally, these files and the file system may be crafted in a way that if they are targeted by certain malware first. For example, if the malware goes alphabetically through the files, the filenames can be crafted such that they are lexically targeted first. In case the key is not successfully recovered, full prevention of the attack may still be achieved if the malware executable is stopped before it targets actual files.

In step 106, one or more responses to the analysis of step 104 may be performed. The one or more responses may include detecting malware (e.g., EBM) executing on the monitored processor and/or detecting a use of an encryption key by the malware. The operations of detecting malware and detecting a use of an encryption key may be performed sequentially or may be performed simultaneously. In some embodiments, detecting malware may include recognizing that what is being executed by the monitored processor is malware. In some embodiments, detecting malware may include recognizing or identifying that a particular type of malware (e.g., EBM) is being executed on the monitored processor. In some embodiments, a detection of EBM may also be a detection of a use of an encryption key. In some embodiments, detecting malware may include recognizing that a specific known malware program is being executed by the monitored processor.

In some embodiments, detecting a use of an encryption key used by the malware may include a recognition that a specific known malware program is being executed and that the specific known malware program uses a specific encryption key. In some embodiments, detecting a use of an encryption key may include a result of the analyzing step 104 that recognizes a sequence of instructions known to be performed when a specific encryption key is being used. The use of the specific encryption key may also comprise a detection that malware is being executed on the monitored processor. In some embodiments, detecting malware executing on a monitored processor and detecting a use of an encryption key may trigger a system to perform countermeasures.

In some embodiments, an identified encryption key can be used to discover a decryption key. For example, if an identified specific type of EBM (e.g., ransomware) is detected and the specific type of EBM is known to use one or more pairs of encryption/decryption keys, the identification of an encryption key may also then be used to identify the paired decryption key. In some embodiments, a decryption key may be computed directly from an encryption key if the encryption key is sufficiently uncomplicated or sophisticated to allow for the computation.

In some embodiments, when a power signature associated with encryption is detected because of analyzing generated power consumption data, a malware detection system may feed the EBM process with a stream of known data (e.g., a stream of bits) instead of files from the file system. Assuming that it is possible to do cryptoanalysis to recover the encryption key by exploiting some vulnerability in the cipher, the know data may help with recovery of the EBM encryption key. For example, several pieces of ciphertext may be collected for chosen plaintext (e.g., Chosen Plaintext Attack). For example, AES using weak S-boxes has been shown easy to cryptanalyze.

In some embodiments, a countermeasure may use trigger fault injection attacks for the purpose of key recovery. This requires to first identify the moment when encryption is happening and then inserting a fault on the power supply at a specific moment in time when the fault creates an advantage. For example, in AES, it is advantageous to enter a fault in one of the last rounds.

Some embodiments of the present disclosure can be used as honeypots. For example, an organization (e.g., a corporation) may place on a network of the organization, in accordance with one or more embodiments, systems having at least one port predetermined to be accessible to malware attacks. The one or more ports may be open ports to lure attackers. Files that are not important to the organization can be placed on the systems. Once an attacker attacks the honeypot, detection and prevention techniques as describe herein can be used to identify and extract the malware (e.g., ransomware) keys.

Figure 3:
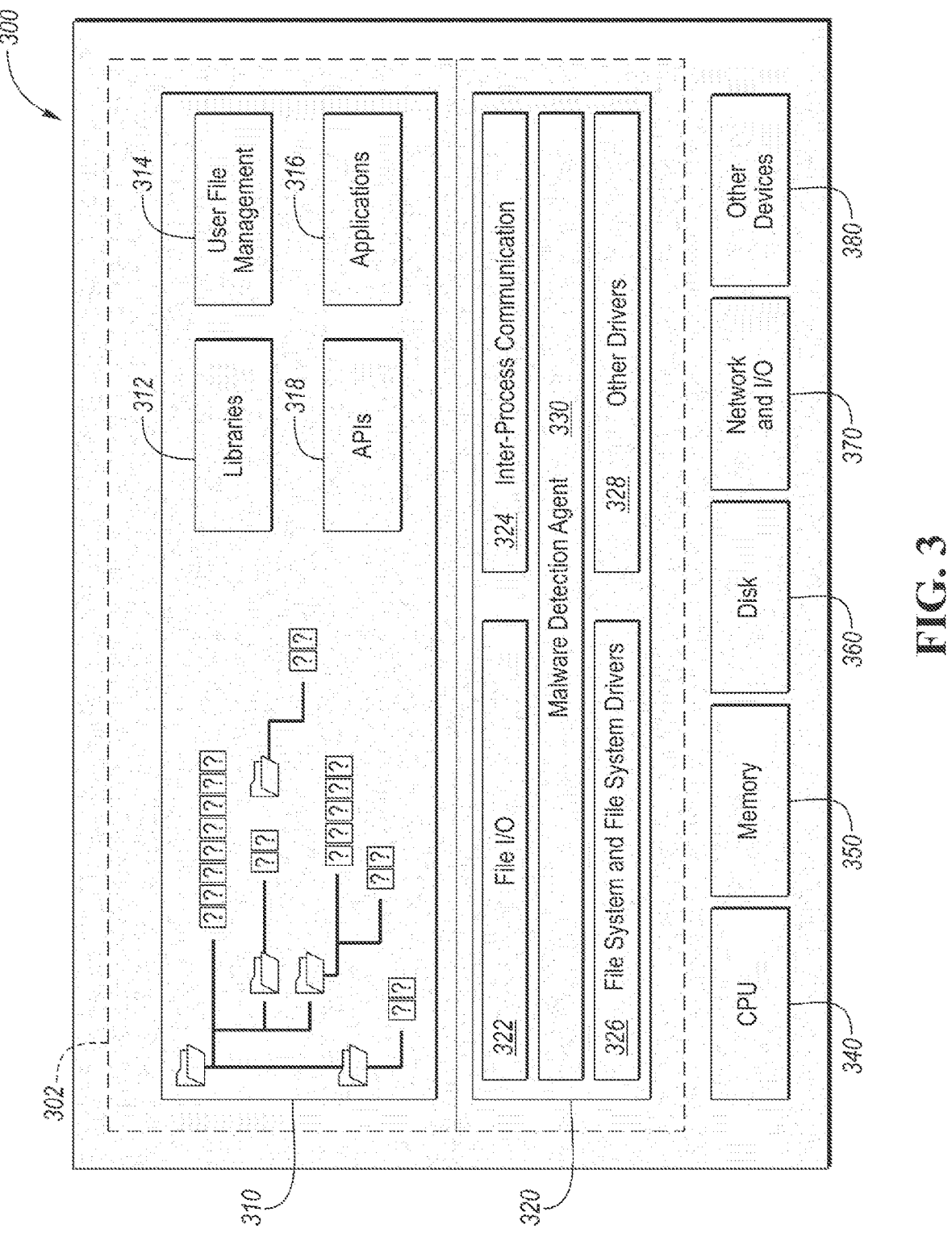
FIG. 3 illustrates an exemplary computing system according to some disclosed embodiments.

FIG. 3 illustrates an exemplary computing system 300 according to some embodiments. The computing system 300 includes an operating system 302, a CPU 340, memory 350, a disk drive 360, network and I/O 370, and other devices 380. The operating system 302 includes a user space 310 and a kernel space 320. The user space 310 includes libraries 312, user file management 314, applications 316, and application program interfaces ("API"). The kernel space 320 of the operating system 302 includes file I/O 322, inter-process communication 324, file system and file system drivers 326, other drivers 328, and a malware detection agent 330.

Figure 5:
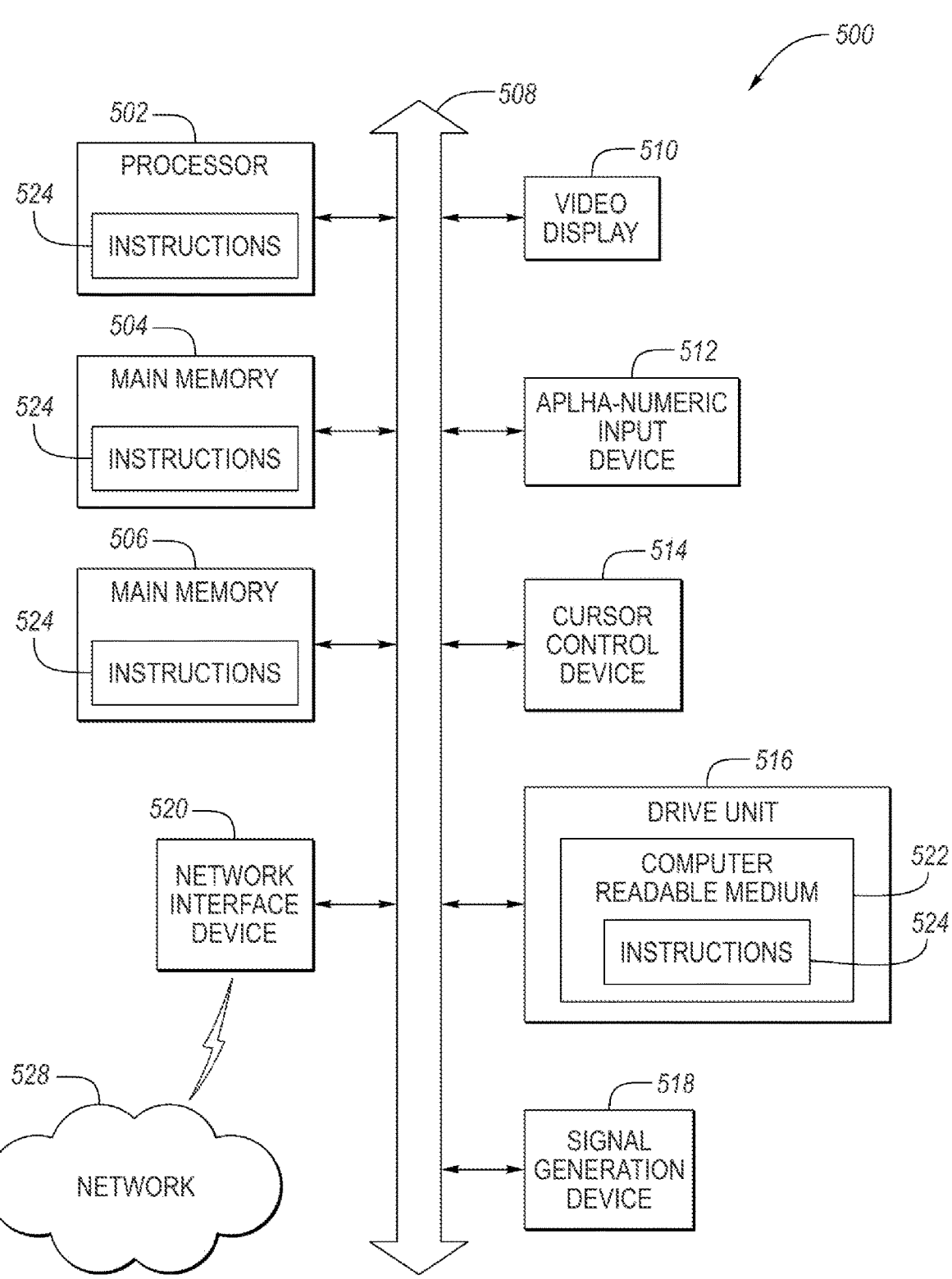
FIG. 5 illustrates an exemplary computing system according to some disclosed embodiments.

The computing system may be embodied in a computer system such as the computer system 500 illustrated in FIG. 5. The CPU 340 is a monitored processor, and the malware detection agent 330 may be software executed by the CPU 340 to protect the computing system 300 from malware attacks. Thus, the CPU 340 executes system software, user software, and software of the malware detection agent 330. The malware detection agent 330 may be configured to monitor the CPU 340 and detect if and/or when the CPU 340 is executing malware. A computing system, such as computing system 300, that includes a monitored processor may be referred to herein as a monitored system.

In some embodiments, the malware detection agent 330 performs the method 100 illustrated in FIG. 1. The malware detection agent 330 may generate power consumption data corresponding the CPU 340. The power consumption data may include measurement data (e.g., current drawn) corresponding to the CPU 340. In some embodiments, a shunt resistor, such as the shunt resistor 206, may be used to collect the measurement data.

The malware detection agent 330 may analyze the generated power consumption data. In some embodiments, the analysis by the malware detection agent 330 includes a comparison of the generated power consumption data with power consumption data corresponding to CPU 340 that was previously generated and stored. In some embodiments, the generated power consumption data is compared with previously generated and stored power consumption data corresponding to a CPU that is similar to CPU 340, such as a semiconductor chip having an identical computer architecture, for example. In some embodiments, metadata of computing system 300 may be used in combination with the generated power consumption data, for example, as described above in relation to step 104 of method 100 illustrated in FIG. 1.

Figure 4:
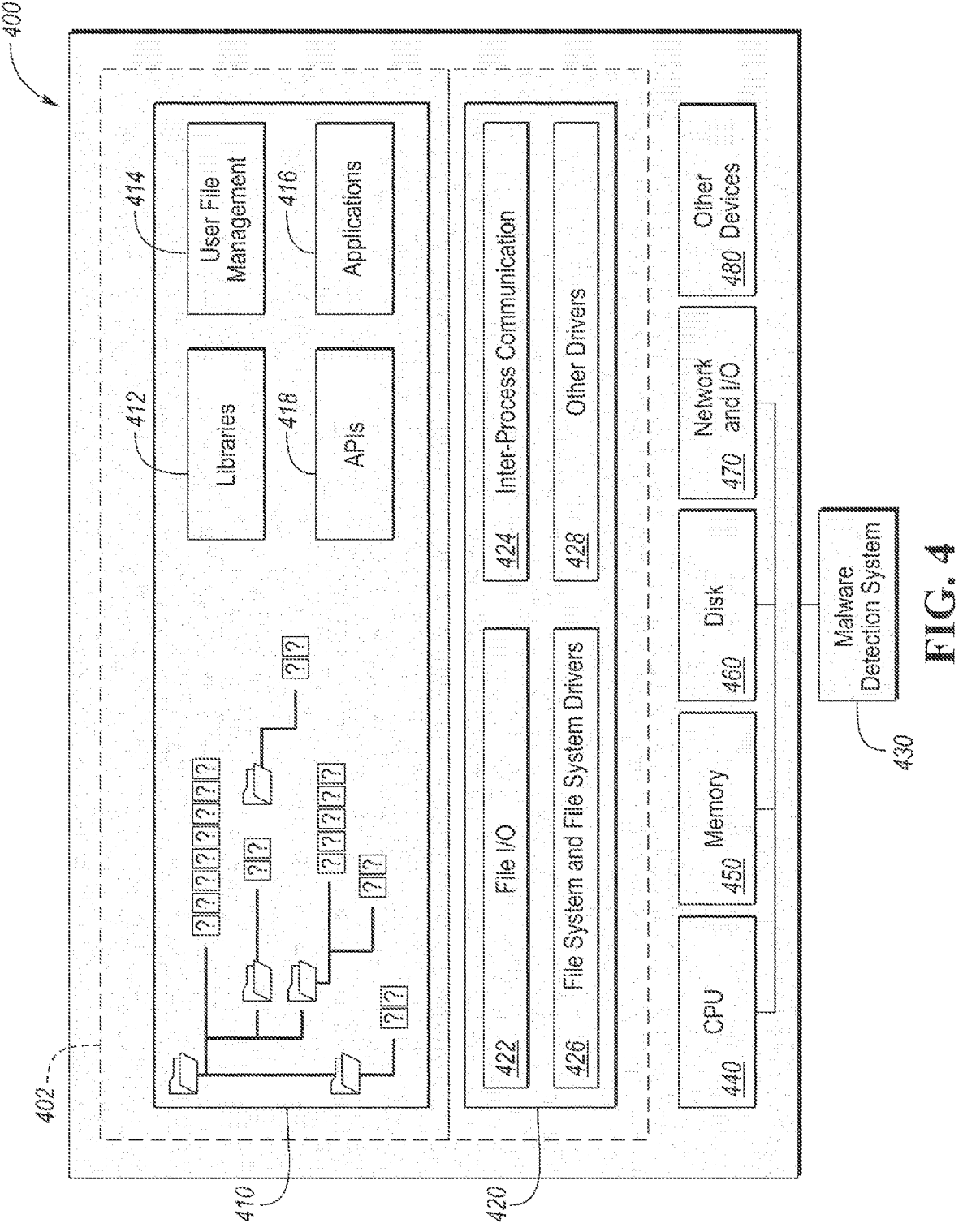
FIG. 4 illustrates an exemplary computing system communicatively connected to a malware detection system according to some disclosed embodiments.

FIG. 4 illustrates an exemplary computing system 400 communicatively connect to a malware detection system 430 according to some embodiments of the present disclosure. The computing system 400 includes an operating system 402, a CPU 440, memory 450, a disk drive 460, network and I/O 470, and other devices 480. The operating system 402 includes a user space 410 and a kernel space 420. The user space 410 includes libraries 412, user file management 414, applications 416, and application program interfaces ("API"). The kernel space 420 of the operating system 402 includes file I/O 422, inter-process communication 424, file system and file system drivers 426, and other drivers 428.

The CPU 440 is a monitored processor, and the malware detection system 440 may be embodied in a computer system such as the computer system 500 illustrated in FIG. 5. The malware detection system 430 may be configured to protect the computing system 400 from malware attacks. An objective of the malware detection system 430 may be to monitor the CPU 440 and detect if and/or when the CPU 440 is executing malware. A computing system, such as computing system 400, that includes a monitored processor may be referred to herein as a monitored system.

In some embodiments, the malware detection system 430 performs the method 100 illustrated in FIG. 1. The malware detection system 430 may generate power consumption data corresponding the CPU 440. The power consumption data may include measurement data (e.g., current drawn) corresponding to the CPU 440. In some embodiments, a shunt resistor, such as the shunt resistor 206, may be used to collect the measurement data.

The malware detection system 430 may analyze the generated power consumption data. In some embodiments, the analysis by the malware detection system 430 includes a comparison of the generated power consumption data with power consumption data corresponding to CPU 440 that was previously generated and stored. In some embodiments, the generated power consumption data is compared with previously generated and stored power consumption data corresponding to a CPU that is similar to CPU 440, such as a semiconductor chip with an identical computer architecture, for example. In some embodiments, metadata of computing system 400 may be used in combination with the generated power consumption data, for example, as described above in relation to step 104 of method 100 illustrated in FIG. 1.

FIG. 5 shows a block diagram of an example embodiment of a general computer system 500. The computer system 500 can include a set of instructions that can be executed to cause the computer system 500 to perform any one or more of the methods or computer-based functions disclosed herein. For example, the computer system 500 may include executable instructions to perform operations disclosed herein, including the operations of method 100. The computer system 500 may be connected to other computer systems or peripheral devices via a network. Additionally, the computer system 500 may include or be included within other computing devices.

As illustrated in FIG. 5, the computer system 500 may include one or more processors 502. The one or more processors 502 may include, for example, one or more central processing units (CPUs), one or more graphics processing units (GPUs), or both. The computer system 500 may include a main memory 504 and a static memory 506 that can communicate with each other via a bus 508. As shown, the computer system 500 may further include a video display unit 510, such as a liquid crystal display (LCD), a projection television display, a flat panel display, a plasma display, or a solid-state display. Additionally, the computer system 500 may include an input device 512, such as a remote-control device having a wireless keypad, a keyboard, a microphone coupled to a speech recognition engine, a camera such as a video camera or still camera, or a cursor control device 514, such as a mouse device. The computer system 500 may also include a disk drive unit 516, a signal generation device 518, such as a speaker, and a network interface device 520. The network interface 520 may enable the computer system 500 to communicate with other systems via a network 528. For example, the network interface 520 may enable a machine learning system to communicate with a database server (not shown) or a controller in manufacturing system (not shown).

In some embodiments, as depicted in FIG. 5, the disk drive unit 516 may include one or more computer-readable media 522 in which one or more sets of instructions 524, e.g., software, may be embedded. For example, the instructions 524 may embody one or more of the methods or functionalities, such as the methods or functionalities disclosed herein. In a particular embodiment, the instructions 524 may reside completely, or at least partially, within the main memory 504, the static memory 506, and/or within the processor 502 during execution by the computer system 500. The main memory 504 and the processor 502 also may include computer-readable media.

In some embodiments, dedicated hardware implementations, such as application specific integrated circuits, programmable logic arrays and other hardware devices, can be constructed to implement one or more of the methods or functionalities described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, embodiments of the present disclosure may encompass software, firmware, and hardware implementations, or combinations thereof.

While the computer-readable medium is shown to be a single medium, the term "computer-readable medium"

includes a single medium or multiple media, such as a centralized or distributed database, and/or associated caches and servers that store one or more sets of instructions. The term "computer-readable medium" shall also include any medium that is capable of storing or encoding a set of instructions for execution by a processor or that cause a computer system to perform any one or more of the methods or functionalities disclosed herein.

In some embodiments, some or all of the computer-readable media will be non-transitory media. In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to strength, durability, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A malware detection system comprising:
one or more processors; and
non-transitory, computer readable media, communicatively connected to the one or more processors, including processor-executable instructions that when executed by the one or more processors cause the malware detection system to perform the following operations:
generating total power consumption data of a monitored system;
analyzing, using a machine learning system, the generated total power consumption data including comparing the generated total power consumption data to stored power consumption data generated during encryption of files that are known to have differentiable power signatures when encrypted, the files including a first file having a first power signature and a second file having a second power signature different than the first power signature, and the first file and the second file are stored on the monitored system; and
in response to the analysis:

detecting malware executed by the monitored system; and
detecting a use of an encryption key by the malware.

2. The malware detection system of claim 1, wherein responding to the analysis further includes:
identifying an encryption key used by the malware to recover the encryption key used by the malware.

3. The malware detection system of claim 1, wherein responding to the analysis further includes executing a countermeasure against the malware.

4. The malware detection system of claim 1, wherein the generated total power consumption data includes statistical analysis of power consumption measurements of the monitored system.

5. The malware detection system of claim 1, wherein detecting malware includes identifying one or more computer-executable instructions of the malware.

6. The malware detection system of claim 5, wherein the identified one or more computer-executable instructions correspond to an encryption process of the malware.

7. The malware detection system of claim 1, further comprising:
a power supply,
wherein detecting malware includes identifying that an encryption is being performed, and wherein the operations include inserting a fault injection attack on the power supply.

8. The malware detection system of claim 1, wherein analyzing the generated total power consumption data includes performing a statistical analysis of the generated total power consumption data.

9. The malware detection system of claim 1, wherein analyzing the generated total power consumption data includes classifying the generated total power consumption data with the machine learning system.

10. The malware detection system of claim 1, wherein analyzing the generated total power consumption data includes analyzing the generated total power consumption data in combination with metadata of the malware detection system.

11. The malware detection system of claim 10, wherein the metadata includes one or more measurements of I/O activities of the malware detection system, one or more measurements of processor usage, one or measurements of memory usage, opened files, usage of an AES-NI encryption engine, and/or more measurements of power drawn by subsystems of the malware detection system.

12. The malware detection system of claim 1, wherein the one or more processors and the non-transitory, computer readable media are included on a host device, the malware detection system further comprising:
an external device including:
a communication module configured to plug into the host device;
memory including predetermined files, the predetermined files being accessible by the host device when the external device is plugged into the host device via the communication module; and
a processor communicatively connected to the communication module and the memory, the processor configured to perform operations of:
monitoring a state of the predetermined files;
detecting a change in the state of the predetermined files; and
in response to detecting the change in the state of the predetermined files, performing operations of:

triggering performance of host prevention operations.

13. The malware detection system of claim 12, wherein the predetermined files are mapped to the host device as user files when the external device is plugged into the host device.

14. The malware detection system of claim 12, wherein responding to the analysis includes extracting the encryption key used by the malware.

15. The malware detection system of claim 12, wherein the non-transitory, computer readable media of the host device includes a privileged executable or a driver that is configured to be aware of the external device and configured to execute the prevention operations.

16. The malware detection system of claim 12, wherein the accessibility of the predetermined files to the host device is constructed such that the predetermined files are targeted first by a specific malware.

17. The malware detection system of claim 16, wherein filenames of the predetermined files are constructed such that malware that targets files in alphabetical order targets the predetermined files first.

18. A malware detection network, comprising:
   at least one malware detection system, comprising:
      at least one port predetermined to be accessible to malware attacks;
      one or more processors; and
      non-transitory, computer readable media, communicatively connected to the one or more processors, including processor-executable instructions that when executed by the one or more processors cause the at least one malware detection system to perform the following operations:

generating total power consumption data for a monitored system;

analyzing, using a machine learning system, the generated power consumption data including comparing the generated total power consumption data to stored power consumption data generated during encryption of files that are known to have differentiable power signatures when encrypted, the files including a first file having a first power signature and a second file having a second power signature different than the first power signature, and the first file and the second file are stored on the monitored system; and in response to the analysis:
   detecting malware executed by the monitored system; and
   detecting a use of an encryption key by the malware.

19. The malware detection network of claim 18, wherein responding to the analysis further includes extracting the encryption key used by the malware.

20. The malware detection network of claim 18, wherein responding to the analysis further includes executing a countermeasure against the malware.

21. The malware detection network of claim 18, wherein the generated total power consumption data includes statistical analysis of power consumption measurements of the monitored system.

22. The malware detection network of claim 18, wherein detecting malware includes identifying one or more computer-executable instructions of the malware.

\* \* \* \* \*